United States Patent Office 2,830,038
Patented Apr. 8, 1958

2,830,038

POLY (POLYALKYLENE ETHER URETHANE) POLYMERS CONTAINING TERMINAL EPOXIDE GROUPS

Dexter B. Pattison, Wilmington, Del., assignor to E. I. du Pont de Nemours and Company, Wilmington, Del., a corporation of Delaware No Drawing. Application May 7, 1957
Serial No. 657,504

10 Claims. (Cl. 260—77.5)

This invention relates to novel polyurethane polyepoxides and more particularly to polyurethane polyepoxides which are prepared from polyalkyleneether glycols and which may be cured to form highly useful elastomers.

Heretofore polyalkyleneether glycol/polyurethane polymers have been found to possess several properties which make them uniquely useful in a number of applications. It has not been possible, however, to use these polymers with advantage as liquid polymers which could be mixed with a curing agent, poured into place, and then cured to form an elastomer in situ. The difficulty usually encountered is the fact that the polymers are extremely reactive with the curing agents and, therefore, become too viscous before the mixtures can be used as practical curable liquids.

It is an object of the present invention to provide novel polyurethane polyepoxides. Another object is to provide a process for the preparation of these novel polyurethane polyepoxides from polyalkyleneether glycols. A still further object is to provide novel polyurethane polyepoxides which are prepared from polyalkyleneether glycols and which may be mixed with curing agents to form relatively stable curable liquids. A still further object is to provide a process for obtaining cured elastomers from these novel polyurethane polyepoxides. Other objects will appear hereinafter.

These and other objects of the present invention are accomplished by a novel polyurethane polymer having a molecular weight of from about 1000 to 11,000 and being characterized by the formula

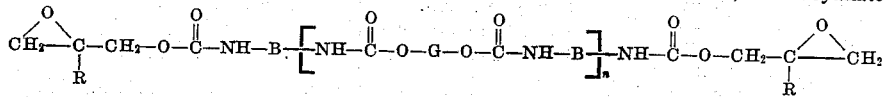

wherein O—G—O is a bivalent radical resulting from removal of the terminal hydrogen atoms from a polyalkyleneether glycol having a molecular weight of from about 750 to 3500; B is a bivalent organic radical, said radical being inert to isocyanate groups; $n$ is an integer ranging from about 1 to 11; and R is selected from the group consisting of hydrogen and a methyl radical. These polyurethane polymers may be converted to curable liquid polymers by incorporating them with a compound such as a polyamine having at least two nitrogen atoms with hydrogen attached thereto, or a polycarboxylic acid anhydride. They may then be cured by the application of heat to form highly useful elastomers.

The polyurethane polyepoxides of the present invention may be prepared by several general procedures involving the reaction of an organic diisocyanate with a polyalkyleneether glycol and a compound containing one hydroxyl and one epoxide group. Thus one mol of a polyalkyleneether glycol may be reacted with two mols of an organic diisocyanate to form an isocyanate-terminated polyurethane which may then be reacted with two mols of a hydroxy epoxide to form a polyurethane containing terminal epoxide groups. A further variation is possible by reacting a molar excess of a polyalkyleneether glycol with an organic diisocyanate so as to form a polyurethane containing terminal hydroxyl groups. This may then be reacted with two mols of an organic diisocyanate so as to form an isocyanate-terminated polyurethane, followed by the reaction with two mols of a hydroxy epoxide. In addition, it is possible to prepare polyurethane polyepoxides within the scope of the present invention by reacting one mol of an organic diisocyanate with one mol of a hydroxy epoxide to form an intermediate containing terminal epoxy and isocyanate groups and then reacting two mols of this intermediate with one mol of a polyalkyleneether glycol so as to provide a polyurethane containing terminal epoxide groups. It is quite obvious that various modifications of these procedures may be used without departing from the spirit and scope of the present invention.

The polyalkyleneether glycols which are used in the present invention may be represented by the formula $HO(GO)_mH$, wherein G is an alkylene radical and $m$ is an integer. It is desired that $m$ should be sufficiently large so that the glycol has a molecular weight of from about 750 to 3500. These polyalkyleneether glycols may be prepared by the polymerization of cyclic ethers, such as alkylene oxides or dioxolanes, or from the condensation of glycols. It is to be understood that in any given glycol, the alkylene radicals represented by G need not necessarily be the same, as, for example, in polytetramethylene formal glycol. Representative glycols include polyethyleneether glycol, polypropyleneether glycol, polytetramethyleneether glycol, etc. For purposes of the present invention, polytetramethyleneether glycol is preferred. Instead of using a polyalkyleneether glycol, othr glycols such as polyalkyleneether-thioether glycols or polyalkylene-aryleneether glycols may be used.

Any of a wide variety of organic diisocyanates may be used to prepare the polyepoxides of the present invention, including aromatic, aliphatic, and cycloaliphatic diisocyanates, and combinations of these types. Mixtures of two or more organic diisocyanates may be used. Representative compounds include toluene-2,4-diisocyanate, m-phenylene diisocyanate, 4-chloro-1,3-phenylene diisocyanate, 4,4'-biphenylene diisocyanate, diphenylmethane-4,4'-diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate), and 1,5-tetrahydronaphthalene diisocyanate. Arylene diisocyanates, such as toluene-2,4-diisocyanate, are preferred.

The hydroxy epoxide compounds which are used to prepare the polyepoxides of the present invention are compounds wherein the epoxide portion and the hydroxyl portion are linked by a methylene radical. Representative compounds include glycidol and 2-methyl glycidol. The preferred compound is glycidol.

As mentioned above, the novel polyurethane polyepoxides of the present invention may be prepared by several general procedures. In one typical method, a molar excess of an organic diisocyanate is reacted with a polyalkyleneether glycol so as to form an isocyanate-terminated polyurethane. Molar ratios of diisocyanate to glycol may range from about 12:11 to 2:1. The reaction between an organic diisocyanate and a polyalkyleneether glycol can be accomplished by heating from 1 to 5 hours at 100° C., or by heating for longer times at lower temperature, e. g., 10 hours at 60° C., with agitation and preferably under an inert atmosphere such as a blanket of nitrogen. The resulting isocyanate-terminated polyurethane may then be reacted with the hydroxy epoxy compound in molar ratios of polyurethane to the hydroxy epoxy compound of about 1:2. The resulting polymer will be a polyurethane containing terminal epoxide groups and having the general formula recited above. These polyurethane polyepoxides may be described as being relatively stable, viscous liquids or solids melting below 100° C.

As described above, the polyurethane polyepoxides of the present invention may be converted to curable liquid polymers by incorporating therewith a liquid organic polyamine or polycarboxylic acid anhydride. These curable liquid polymers can be cured to produce highly useful elastomers by pouring them into molds and heating at temperatures of about 80 to 160° C. If desired, some of these liquid polymers can be cured by allowing them to stand at room temperature for longer periods of time. It is preferred that these liquid polymers be cured by the application of heat since the reaction of the polyamine or the polycarboxylic acid anhydride is relatively slow at room temperature. In view of this fact, these curable liquid polymers have sufficient pot life and stability which enables them to be used as practical curable liquid polymers.

The organic liquid polyamines which are added to the polyurethane polyepoxides of the present invention so as to form curable liquid polymers may be any of a wide variety of aromatic or aliphatic polyamines. These polyamines must contain at least two primary or secondary amine groups, i. e., at least two amino nitrogen atoms which have hydrogen attached thereto. It is to be understood that these polyamines may contain other substituents; however, if these other substituents are functional groups, i. e., groups containing active hydrogen, they are to be less reactive with epoxides than are the amine groups. For purposes of the present invention, the preferred polyamines are the aromatic diamines such as m-phenylenediamine, 2,4-diaminocumene, or mixtures thereof. Other representative diamines which may be used include aliphatic compounds such as ethylene diamine, 1,3-diaminopropanol-2, and hydroxyethylethylene diamine; aryl-alkyl compounds such as 4,4'-methylene-bis-(2-chloroaniline); and polyalkylene polyamines, such as 2,2'-diamino-1,1'-dimethyldiethylamine, 3,3'-diaminodipropylamine, and triethylene tetramine. Polymeric polyamines may also be used. Representative polymeric polyamine may be obtained by reacting one mol of the bischloroformate of polytetramethyleneether glycol with two mols of a diamine, such as m-phenylenediamine or 4,4'-methylene-bis-(N-methylaniline). The amount of organic polyamine which is necessary to effectively cure the polyurethane polyepoxides must be selected so as to provide at least one hydrogen-bearing amino nitrogen atom for each epoxide group. This is the theoretical amount. The amount of polyamine may be as high as about 80 to 200% of this theoretical amount, with the preferred range being from about 100 to 140%.

The organic polyamine functions as a curing agent for the polyurethane polyepoxides. The active hydrogen on the amino nitrogen atoms reacts with the terminal epoxide groups as follows:

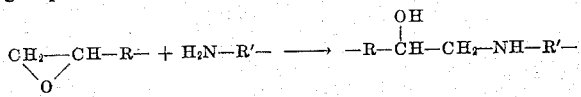

In the instances where a polyamine containing more than two active hydrogen atoms attached to nitrogen atoms is used, the resulting cured polyurethane polyepoxide will be a cross-linked structure.

Another curing agent which may be incorporated with the polyurethane polyepoxides of the present invention is an organic polycarboxylic acid anhydride. Any of a wide variety of aliphatic or aromatic polycarboxylic acid anhydrides, such as glutaric anhydride, phthalic anhydride, pyromellitic dianhydride may be used. Additional compounds which may be used are succinic anhydride, maleic anhydride, phthalic anhydride substituted in the nucleus, hydrogenated phthalic anhydride, and polymerized acid anhydrides such as polyadipic and polysebacic acid anhydrides. The amount of organic polycarboxylic acid anhydride which is necessary to effectively cure the polyurethane polyepoxides must be selected so as to provide one mol of anhydride for each epoxide group. This is the theoretical amount. The amount of anhydride may be as high as 80 to 110% of this theoretical amount. The reaction mechanism involves conversion of the anhydride groups and epoxide groups to ester linkages.

The following examples will better illustrate the nature of the present invention; however, the invention is not intended to be limited to these examples. Parts are by weight unless otherwise indicated.

*Example 1*

37.4 parts of toluene-2,4-diisocyanate is added to a stirred mixture of 333 parts of polytetramethyleneether glycol of 3100 molecular weight and 15.9 parts of glycidol kept under nitrogen. The mixture is stirred for 20 hours at 80° C. to give a polyurethane of about 3600 molecular weight with an epoxide group at each end of the chain. The very viscous solution is cooled below 50° C. and 208 parts of chloroform is added to make a solution containing 65% polyurethane polyepoxide.

The polyurethane polyepoxide is cured by mixing 15.4 parts of the 65% solution with 0.17 part of ethylene diamine. The liquid is poured into a mold and is heated 4 hours at 80° C., during which time the chloroform evaporates. After this treatment, the product is a thoroughly cured elastomer of light color with good resilience and fair tensile strength.

Increasing the amount of ethylene diamine to 0.20 part or decreasing the amount of ethylene diamine to 0.134 part affects only slightly the properties of the resultant elastomer. The addition of high abrasion furnace black (3.0 parts of black for 15.4 parts of the 65% polyurethane polyepoxide solution) results in an elastomer with a much higher modulus and a lower elongation at break.

To obtain quantitative data, 62 parts of the 65% polyurethane polyepoxide solution is mixed with 1.37 parts of 3,3'-diaminodipropylamine. The liquid is put on a rubber roll mill and is mixed for 30 minutes at 80–90° C. to remove solvent. Williams rings and Yerzley resilience pellets are made by curing in molds for 30 minutes at 120° C. Properties measured at 25° C. are:

| | |
|---|---|
| Modulus at 300% elongation | 350 |
| Tensile strength at break, p. s. i. | 2200 |
| Elongation at break, percent | 580 |
| Yerzley resilience | 62 |
| Shore hardness | 50 |

*Example 2*

A mixture of 293 parts of polytetramethyleneether glycol of 977 molecular weight, containing 1% phenyl-β-naphthylamine as an antioxidant, and 34.8 parts of toluene-2,4-diisocyanate is heated with stirring for 3 hours at 100° C. under nitrogen. After cooling to 70° C., 34.8 parts of toluene-2,4-diisocyanate is added dropwise over ½ hour, and the mixture is heated 2 hours at 70–75° C. Then 16.3 parts of glycidol (110% of the theoretical amount) is added. The mixture is stirred a few minutes, poured into a polyethylene bag, and heated 3 days at 80° C. in an oven. The resultant polyurethane polyepoxide is a very viscous liquid of about 3780 molecular weight.

100 parts of the polyurethane polyepoxide is dissolved in 200 parts of boiling chloroform and is mixed with 1.7 parts of 1,2-diaminopropanol-2. After heating 3 hours in an oven at 80° C., the product is a well-cured elastomer with good tensile strength and resilience.

*Example 3*

Starting with a polytetramethyleneether glycol of 1074 molecular weight, a polyurethane polyepoxide having a molecular weight of about 2820 is prepared by the method described in Example 2.

100 parts of this polyurethane polyepoxide, dissolved in 50 parts of tetrahydrofuran and 50 parts of chloroform, is mixed with 1.57 parts of triethylene tetramine. After standing 2 days at room temperature and 3 hours at 80° C., the product is a resilient elastomer with good tensile strength. The properties of the elastomer appear unchanged after heating for 6 hours at 100° C. and then for 5 hours at 120° C.

The polyurethane polyepoxide can also be cured to an elastomer using 2.5% hydroxyethylethylene diamine.

*Example 4*

With stirring under nitrogen, 34.8 parts of toluene-2,4-diisocyanate is added to 293 parts of polytetramethyleneether glycol having a molecular weight of 977 and containing 1% phenyl-β-naphthylamine. The liquid is heated to 100° C. and is maintained at 100° C. for 3 hours. After cooling to 70° C., 37.7 parts of diphenylmethane-4,4'-diisocyanate and 7.4 parts of glycidol are added. The mixture is stirred rapidly for 5 minutes, poured into a polyethylene bag, and heated at 80° C. for 3 days. The resulting polyurethane polyepoxide is a very viscous liquid having a molecular weight of about 7450.

100 parts of this polyurethane polyepoxide is dissolved in about 300 parts of boiling chloroform. This solution is thoroughly mixed with 1.84 parts of 3,3'-diaminodipropylamine and poured into a mold. After keeping overnight at room temperature and 4 hours at 80° C., the product is a cured elastomer with good tensile strength and high elongation at the break.

*Example 5*

With stirring under nitrogen, 41.8 parts of toluene-2,4-diisocyanate is added to 352 parts of polytetramethyleneether glycol having a molecular weight of 977 and containing 1% phenyl-β-maphthylamine. The liquid is heated to 100° C. and maintained at 100° C. for 3 hours. After cooling to 70° C., there is added 40.2 parts of diphenylmethane-4,4'-diisocyanate and 5.9 parts of glycidol. The mixture is stirred rapidly for 5 minutes, poured into a polyethylene bag, and heated at 80° C. for 3 days. The polyurethane polyepoxide is an extremely viscous liquid having a molecular weight of about 11,000.

100 parts of this polyurethane polyepoxide is cured by the method of Example 4 except that 1.24 parts of 3,3'-diaminodipropylamine is used. A soft, tacky elastomer is obtained.

*Example 6*

A mixture of 149.3 parts of dry polytetramethyleneether glycol of 977 molecular weight containing 1% phenyl-β-naphthylamine as an antioxidant and 52.2 parts of toluene-2,4-diisocyanate is stirred in a nitrogen atmosphere for 2 hours at 70–75° C. 26.7 parts of 2-methyl glycidol is added dropwise over 10–15 minutes. The mixture is held at 70–75° C. for 2 hours. The product is a viscous liquid having a molecular weight of about 1501 with an epoxide group on each end of the chain.

30 parts of this polyurethane polyepoxide is mixed with 1.2 parts of ethylene diamine at room temperature. After thorough mixing, the material is allowed to age 2 days at room temperature, thereby yielding a cured elastomer with good tensile strength and good resilience.

*Example 7*

(A) A mixture of 135.8 parts of polytetramethyleneether glycol having a molecular weight of 970 and containing 0.2% 2,6-ditertiary butyl-4-methylphenol as an antioxidant and 48.7 parts of toluene-2,4-diisocyanate is heated under nitrogen at 70–75° C. for 3 hours. Then 20.7 parts of glycidol is added and the mixture is heated at 70–80° C. for 22 hours. The polyurethane polyepoxide is a viscous, almost colorless liquid having a molecular weight of about 1474.

(B) A mixture of 29.4 parts of the polyurethane polyepoxide of (A) above and 1.19 parts of m-phenylenediamine is heated for 5 minutes at 80° C. and 2 minutes at 100° C. The liquid is poured into a mold and heated for 24 hours at 80° C. The product is a brown elastomer with moderate tensile strength and resilience, both at room temperature and at 80° C.

(C) A mixture of 29.4 parts of polyurethane polyepoxide of (A) above and 1.61 parts of a liquid diamine consisting of equal parts of m-phenylenediamine and 2,4-diaminocumene is mixed at 100° C. and poured into a mold. After curing 24 hours at 80° C., the product is a well-cured brown elastomer with moderate tensile strength and resilience, both at room temperature and at 80° C.

(D) A mixture of 29.4 parts of the polyurethane polyepoxide of (A) above and 3.36 parts of 4,4'-methylenebis-(2-chloroaniline) is heated at 100° C. and poured into a mold. After curing 3 days at 100° C., the product is a cured but slightly tacky elastomer with moderate tensile strength and resilience.

(E) A mixture of 14.7 parts of the polyurethane polyepoxide of (A) above and 7.7 parts of a polymeric primary diamine having a molecular weight of 1278 is stirred at 80–100° C., poured into a mold and cured for 24 hours at 100° C. The product is a cured elastomer with moderate tensile strength and resilience. The polymeric primary diamine used above is prepared by first mixing 1200 parts of benzene, 175 parts of calcium hydroxide, and 32.6 parts of m-phenylene-diamine and then a solution of 171.4 parts of the bischloroformate of polytetramethyleneether glycol, having a molecular weight of 1135, in 500 parts of benzene, is added dropwise to the stirred mixture over a 1½ hour period. The mixture is stirred at room temperature overnight and then filtered. The benzene is removed at reduced pressure. The resulting polyurethanediamine is a viscous oil.

(F) A mixture of 14.7 parts of the polyurethane polyepoxide of (A) above, 3.2 parts of the polymeric primary diamine described in (E) above, and 4.5 parts of a polymeric secondary amine having a molecular weight of 1514 is heated at 80–100° C. for 10 minutes, poured into a mold, and heated for 3 days at 100° C. The product is a soft cured elastomer with low modulus, high break elongation, and good tensile strength and resilience. The polymeric secondary diamine used above is prepared by first mixing 1200 parts of benzene, 175 parts of calcium hydroxide, and 67.9 parts of 4,4' - methylene - bis - (N-methylaniline) and then adding dropwise to the stirred mixture, over a 1½ hour period, a solution of 170.3 parts of the bischloroformate of polytetramethyleneether glycol, having a molecular weight of 1135, in 500 parts of benzene. The mixture is stirred at room temperature overnight and then filtered. The benzene is removed at reduced pressure. The resulting polyurethane secondary diamine is a viscous oil.

(G) A mixture of 14.7 parts of the polyurethane polyepoxide of (A) above, 2.66 parts of pthalic anhydride, and 0.15 part of 4,4'-methylene-bis-(N,N-dimethylaniline) is stirred at 100° C. and the liquid is poured into a mold. After curing in an oven for 2½ hours at 100° C., the product is a well-cured elastomer with moderate tensile strength and resilience.

*Example 8*

A mixture of 25 parts of high abrasion furnace black and 75 parts of the polyurethane polyepoxide of Example 7(A) is passed several times through a 3-roll ink mill in order to disperse the carbon black in the liquid. Then 19.6 parts of this mixture and 6.4 parts of the polymeric primary diamine described in Example 7(E) are mixed thoroughly and poured into a pan. After curing for 48 hours at 100° C., the product is an elastomer with very good tensile strength and resilience. This elastomer which contains 23 parts of carbon black per 100 parts of polymer is stronger and has a higher modulus than a similar sample containing no carbon black.

*Example 9*

(A) A mixture of 14.7 parts of the polyurethane polyepoxide of Example 7(A), 6.0 parts of a commerical epoxy resin having the formula

where 73% of the R's are

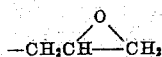

and 27% of the R's are hydrogen, and 1.80 parts of ethylene diamine is stirred at room temperature and poured into a mold. After curing for 2 hours at 60° C., the product is a thoroughly cured, tough plastic.

(B) A mixture of 14.7 parts of the polyurethane polyepoxide of Example 7(A), 5.3 parts of a commercial epoxy resin having the formula

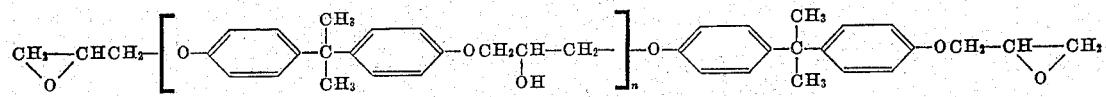

where the average value for $n=0.4$, and 2.16 parts of m-phenylenediamine is heated at 80–100° C. for 10 minutes and poured into a mold. After curing for 5 hours at 80° C., the product is a thoroughly cured, tough plastic with good strength at 80° C. and at room temperature.

(C) A mixture of 75 parts of the polyurethane polyepoxide of Example 7(A), 25 parts of a commercial epoxy resin having the formula

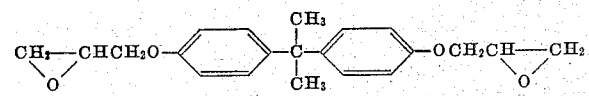

and 7.5 parts of a liquid diamine, which consists of equal parts of m-phenylenediamine and 2,4-diaminocumene, is stirred at 100° C., poured into molds, and cured for 2 hours at 100° C. The product is a tough plastic with a tensile strength of 4500 p. s. i. at 25° C. and an elongation at break of 250%. It has excellent impact strength and good tear strength.

(D) A mixture of 25 parts of the polyurethane polyepoxide of Example 7(A), 75 parts of a commercial epoxy resin having the formula

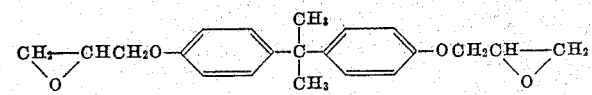

and 14 parts of a liquid diamine, which consists of equal parts of m-phenylenediamine and 2,4-diaminocumene, is stirred at 100° C., poured into molds and cured for 2 hours at 100° C. The product is a hard plastic which is less brittle and has higher impact strength than a plastic prepared from 100 parts of the commercial epoxy resin alone.

*Example 10*

(A) A polyformal glycol is prepared by heating 416 parts of 1,5-penetanediol, 127 parts of paraformaldehyde, and 0.4 part of p-toluenesulfonic acid under a nitrogen atmosphere for 6 hours at 120–125° C. with rapid refluxing. After cooling and stirring for 2 hours with 1 part of decolorizing carbon, 4 parts of calcium hydroxide, and 1 part of an antioxidant, 4-methyl-2,6-ditertiary butylphenol, the liquid portion is separated by filtration and the cake is washed with benzene. Volatile material is removed by drying in a rotating flask, finishing at 100–115° C. for 2 hours at 2 mm. pressure. The polyformal glycol, which is solid at room temperature, has a hydroxyl number of 48.5 and a molecular weight of 2315.

(B) 231.5 parts of the polyformal glycol prepared in A above and 34.8 parts of toluene-2,4-diisocyanate is heated for 2 hours at 70–75° C. Then 14.8 parts of glycidol is added, and the mixture is heated for 2 hours at 70° C. and for 16 hours at 80° C. to form a polyurethane polyepoxide. Curing is effected by mixing at 80° C., 22.5 parts of this polyurethane polyepoxide with 0.48 part of m-phenylenediamine and heating the liquid for 24 hours at 100° C. in an oven. The product is a cured, slightly tacky elastomer with good tensile strength and resilience.

It is apparent from the foregoing examples that the polyurethane epoxides of the present invention may be cured by means of polyamines or polycarboxylic acid anhydrides to form highly useful elastomers. These elastomers may be employed in the preparation of a wide variety of articles, such as belts, hose and tubing, wire and cable jackets, footwear, coated fabrics, etc. When these polyurethane polyepoxides are used as curable liquid polymers, they may be used advantageously to form intricate shaped articles since they may be poured into molds and cured in situ. The polyurethane polyepoxides may also be used in combination with commercially available epoxy resins to obtain plastics which have better properties than do plastics obtained from the commercial epoxy resins alone. Thus the combination of these polyurethane polyepoxides with commercial epoxy resins produces plastics having a resilient nature with high thermal stability, good electrical properties, and resistance to moisture.

The properties of the cured elastomers which are obtained from the polyurethane polyepoxides of the present invention may be varied by suitable compounding ingredients, such as carbon black, silica, calcium carbonate, and other fillers. Generally, these compounding ingredients are incorporated with the polyurethane polyepoxide prior to curing.

As many widely different embodiments of this invention may be made without departing from the spirit and scope thereof, it is to be understood that this invention is not limited to the specific embodiments thereof except as defined in the appended claims.

What is claimed is:

1. A polyurethane polymer having a molecular weight of from about 1000 to 11,000 and being characterized by the formula

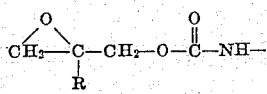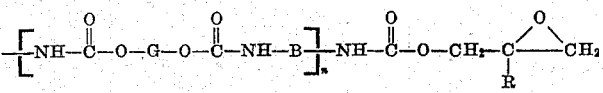

wherein O—G—O is a bivalent radical resulting from removal of the terminal hydrogen atoms from a polyalkyleneether glycol having a molecular weight of from about 750 to 3500; B is a bivalent organic radical, said radical being inert to isocyanate groups; $n$ is an integer ranging from about 1 to 11; and R is selected from the group consisting of hydrogen and a methyl radical.

2. The polymer of claim 1 wherein R is hydrogen.

3. The polymer of claim 2 wherein the bivalent organic radical, B, is an arylene radical.

4. The polymer of claim 3 wherein B is a tolylene radical.

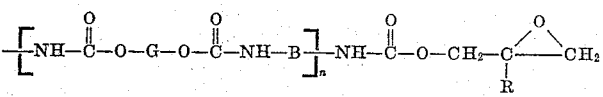

5. The polymer of claim 3 wherein the bivalent radical O—G—O is obtained by removal of the terminal hydrogen atoms from a polytetramethyleneether glycol.

6. The polymer of claim 4 wherein the bivalent radical O—G—O is obtained by removal of the terminal hydrogen atoms from a polytetramethyleneether glycol.

7. A curable composition comprising (a) a polyurethane polymer having a molecular weight of from about 1000 to 11,000 and being characterized by the formula

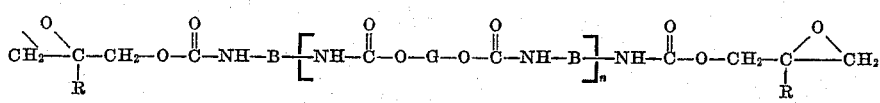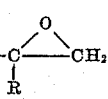

wherein O—G—O is a bivalent radical resulting from removal of the terminal hydrogen atoms from a polyalkyleneether glycol having a molecular weight of from about 750 to 3500; B is a bivalent organic radical, said radical being inert to isocyanate groups; $n$ is an integer ranging from about 1 to 11; and R is selected from the group consisting of hydrogen and a methyl radical; and (b) an organic polyamine.

8. A curable composition comprising (a) a polyurethane polymer having a molecular weight of from about 1000 to 11,000 and being characterized by the formula wherein O—G—O is a bivalent radical resulting from removal of the terminal hydrogen atoms from a polyalkyleneether glycol having a molecular weight of from about 750 to 3500; B is a bivalent organic radical, said radical being inert to isocyanate groups; $n$ is an integer ranging from about 1 to 11; and R is selected from the group consisting of hydrogen and a methyl radical; and (b) an organic polycarboxylic acid anhydride.

9. The curable composition of claim 7 wherein the organic polyamine is m-phenylenediamine.

10. The curable composition of claim 8 wherein the organic polycarboxylic acid anhydride is phthalic anhydride.

References Cited in the file of this patent

UNITED STATES PATENTS 2,730,531     Payne et al. _____ Jan. 10, 1956

FOREIGN PATENTS 733,624     Great Britain _____ July 13, 1955
758,433     Great Britain _____ Oct. 3, 1956

UNITED STATES PATENT OFFICE
Certificate of Correction

Patent No. 2,830,038                                       April 8, 1958

Dexter B. Pattison

It is hereby certified that error appears in the printed specification of the above numbered patent requiring correction and that the said Letters Patent should read as corrected below.

Column 2, line 35, for "othr" read —other—; column 5, line 43, for "-maphthylamine" read —naphthylamine—; column 6, line 63, for "pthalic" read —phthalic—; column 9, claim 7, the extreme left-hand portion of the formula should appear as shown below instead of as in the patent—

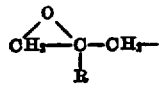

Signed and sealed this 20th day of May 1958.

[SEAL]

Attest:
KARL H. AXLINE,
*Attesting Officer.*

ROBERT C. WATSON,
*Commissioner of Patents.*